United States Patent
Wu et al.

(10) Patent No.: US 10,380,358 B2
(45) Date of Patent: *Aug. 13, 2019

(54) MPEG TRANSPORT FRAME SYNCHRONIZATION

(71) Applicant: MICROSOFT TECHNOLOGY LICENSING, LLC, Redmond, WA (US)

(72) Inventors: Yongjun Wu, Bellevue, WA (US); Shyam Sadhwani, Bellevue, WA (US); Robert K. Hughes, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,021

(22) Filed: Jul. 18, 2018

(65) Prior Publication Data

US 2018/0341777 A1    Nov. 29, 2018

Related U.S. Application Data

(63) Continuation of application No. 15/048,181, filed on Feb. 19, 2016, now Pat. No. 10,032,034.
(Continued)

(51) Int. Cl.
*G06F 21/60*    (2013.01)
*H04N 21/2347*    (2011.01)
(Continued)

(52) U.S. Cl.
CPC ......... *G06F 21/602* (2013.01); *H04N 19/188* (2014.11); *H04N 19/70* (2014.11);
(Continued)

(58) Field of Classification Search
CPC ............ G06F 21/602; H04N 21/23476; H04N 21/23605; H04N 21/4343; H04N 19/188;
(Continued)

(56) References Cited

U.S. PATENT DOCUMENTS 6,593,926 B1    7/2003    Yamaguchi et al.
8,031,909 B2    10/2011    Se et al.
(Continued)

OTHER PUBLICATIONS

"3D Printing: A World of Possibilities", Retrieved from: https://web.archive.org/web/20150401162513/https://www.mepa.org.mt/file.aspx?f=11732, Sep. 2014, 10 Pages.
(Continued)

*Primary Examiner* — Baotran N To
(74) *Attorney, Agent, or Firm* — Newport IP, LLC; Han Gim

(57) ABSTRACT

Techniques are described for communicating encoded data using start code emulation prevention. The described techniques include obtaining at least one partially encrypted packet, identifying at least one portion of the packet that is unencrypted, and determining that the identified unencrypted portion(s) emulates a start code. Start code emulation prevention data or emulation prevention bytes (EPBs) may be inserted into only the encrypted portion of the packet. The modified packet may be communicated to another device/storage, along with an indication of which portion(s) of the packet are unencrypted. Upon receiving the packet and indication, the receiving device may identify and remove the EPBs in the identified unencrypted portion(s) of the packet, and decrypt the packet to recover the data. In some aspects, upon identifying the indication, the receiving device may only search for EPBs in the unencrypted portion(s) of the packet, thus yielding a more efficient start code emulation prevention process.

20 Claims, 9 Drawing Sheets

Related U.S. Application Data

(60) Provisional application No. 62/238,025, filed on Oct. 6, 2015.

(51) Int. Cl.

| | | |
|---|---|---|
| *H04N 21/236* | (2011.01) | |
| *H04N 21/434* | (2011.01) | |
| *H04N 21/4405* | (2011.01) | |
| *H04N 21/235* | (2011.01) | |
| *H04N 21/435* | (2011.01) | |
| *H04N 19/70* | (2014.01) | |
| *H04N 19/169* | (2014.01) | |

(52) U.S. Cl.
CPC ..... *H04N 21/235* (2013.01); *H04N 21/23476* (2013.01); *H04N 21/23605* (2013.01); *H04N 21/435* (2013.01); *H04N 21/4343* (2013.01); *H04N 21/44055* (2013.01)

(58) Field of Classification Search
CPC .... H04N 21/235; H04N 21/435; H04N 19/70; H04N 21/44055
See application file for complete search history.

(56) References Cited

U.S. PATENT DOCUMENTS

| | | | |
|---|---|---|---|
| 8,243,065 | B2 | 8/2012 | Kim |
| 8,274,506 | B1 | 9/2012 | Rees |
| 8,339,393 | B2 | 12/2012 | Sugahara |
| 8,384,715 | B2 | 2/2013 | Loop et al. |
| 8,542,872 | B2 | 9/2013 | Gornick et al. |
| 8,963,943 | B2 | 2/2015 | Chu et al. |
| 8,984,099 | B1 | 3/2015 | Giencke et al. |
| 9,105,129 | B2 | 8/2015 | Rohlf |
| 9,542,724 | B1 | 1/2017 | Rosasco et al. |
| 10,032,034 | B2* | 7/2018 | Wu ................... G06F 21/602 |
| 2002/0011941 | A1 | 1/2002 | Endo et al. |
| 2003/0146855 | A1* | 8/2003 | Sullivan ............. H04J 3/07 341/1 |
| 2004/0176908 | A1 | 9/2004 | Senda et al. |
| 2005/0028192 | A1* | 2/2005 | Hooper ............... H04N 5/913 725/31 |
| 2007/0065002 | A1 | 3/2007 | Marzell et al. |
| 2007/0188516 | A1 | 8/2007 | Ioup et al. |
| 2008/0208547 | A1 | 8/2008 | Kim et al. |
| 2009/0168805 | A1* | 7/2009 | Sullivan ............. H04J 3/07 370/474 |
| 2010/0156901 | A1 | 6/2010 | Park et al. |
| 2013/0131978 | A1 | 5/2013 | Han et al. |
| 2014/0108464 | A1 | 4/2014 | Rohlf et al. |
| 2014/0232743 | A1 | 8/2014 | Na et al. |
| 2014/0274138 | A1 | 9/2014 | Chao et al. |
| 2015/0042678 | A1 | 2/2015 | Alt et al. |
| 2016/0040996 | A1 | 2/2016 | Skillman et al. |
| 2016/0048298 | A1 | 2/2016 | Choi et al. |
| 2016/0232256 | A1 | 8/2016 | Lokitz et al. |
| 2017/0090460 | A1 | 3/2017 | Andrew et al. |
| 2017/0091993 | A1 | 3/2017 | Andrew et al. |

OTHER PUBLICATIONS

"Digitizer TooL", Reterived From: http://www.globalmapper.com/helpv11/Help_DigitizerTool.html, Jun. 23, 2009, pp. 1-16.

"World Geodetic System", Retrieved from: https://en.wikipedia.org/w/index_php?title=World_Geodetic_System&oldid=679249271, Sep. 3, 2015, 6 Pages.

"Final Office Action Issue din U.S. Appl. No. 15/052,069", dated Jun. 23, 2017, 23 Pages.

"Final Office Action Issued in U.S. Appl. No. 15/052,069", dated Apr. 13, 2018, 18 Pages.

"Non-Final Office Action Issued in U.S. Appl. No. 15/052,069", dated Feb. 23, 2017, 20 Pages.

"Non-Final Office Action Issued in U.S. Appl. No. 15/052,069", dated Nov. 30, 2017, 23 Pages.

"Final Office Action Issued in U.S. Appl. No. 15/052,088", dated Nov. 20, 2018, 20 Pages.

"Non Final Office Action Issued in U.S. Appl. No. 15/052,088", dated May 11, 2018, 18 Pages.

Arponen, Matti, "From 2D Base Map to 3D City Model", In Proceedings of Urban Data Management Society, Oct. 2, 2002, 12 Pages.

Doug, McCune, "Using shp2stl to Convert 1-15 Maps to 3D Models", Retrieved from: https://en.wikipedia.org/w/index.php?title=World_Geodetic_System&oldid=679249271, Dec. 30, 2014, 12 Pages.

Horiguchi, et al., "Reconstructing Road and Block from Dem in Urban Area", In Proceedings of International Archives of Photogrammetry and Remote Sensing, Jul. 16, 2000, pp. 413-420.

"International Search Report and Written Opinion Issued in PCT Application No. PCT/US2016/051194", dated Dec. 16, 2016, 10 Pages.

"International Search Report and Written Opinion Issued in PCT Application No. PCT/US2016/051196", dated Dec. 16, 2016, 12 Pages.

\* cited by examiner

MPEG TRANSPORT FRAME SYNCHRONIZATION

CROSS REFERENCE TO RELATED APPLICATIONS

This application is a continuation of and claims priority to U.S. patent application Ser. No. 15/048,181, entitled "MPEG Transport Frame Synchronization" and filed Feb. 19, 2016, which claims benefit under 35 U.S.C. § 119(e) of U.S. Provisional U.S. Patent Application No. 62/238,025, filed Oct. 6, 2015, the contents of which are incorporated herein by reference in their entirety.

TECHNICAL FIELD

This disclosure relates generally to video and audio signal processing. More specifically, the disclosure relates to a method and system for improving the processing of MPEG Transport Stream (TS) and other data.

BACKGROUND

The distribution and consumption of digital data and media is ever increasing. Digital data is typically transmitted, for example, by a transmitter/receiver that encodes and/or encrypts the digital data. A receiver subsequently receives the encoded and encrypted data, decrypts and decodes the data, for ultimate delivery and rendering to a user. The digital data may include video, audio, picture, text, and other data. Synchronization points or identifiers or start points of various portions of the digital data (e.g., packets or frames) may be included in transmitted and/or stored media, such as video, for example, to enable error correction, accurate and clean start and stop times of video, decoding in the middle of or only a portion of the data, etc. In order to prevent false identification of these start or synchronization points, which may, for example, indicate the start of a frame or picture in various file formats or standards, such as Moving Picture Expert Group (MPEG) 2 (H.262) or 4 (.mp4) (H.264), identifiers may be placed in the data to indicate the occurrence of a portion of data that is similar or identical to the start point or start code (e.g., start code emulation). These identifiers may be referred to as emulation prevention bytes (EPBs). In some cases, portions or all of the digital data may be encrypted for example, to ensure that the data is not modified or intercepted and decoded by an unauthorized party. The process of encrypting portions of data may create challenges during insertion of an EPB and subsequent decoding processes. In some instances, switching between various data formats (e.g., video formats), may be more difficult and time consuming based on the presence of EPBs. Accordingly, improvements can be made to the process of searching for start codes, inserting EPBs, and encrypting digital data.

SUMMARY

Illustrative examples of the disclosure include, without limitation, methods, systems, and various devices. In one aspect, techniques for communicating encoded data using start code emulation prevention is described. A partially encrypted packet may be received, and a portion of the partially encrypted packet that is unencrypted may be identified. A determination may be made that the identified unencrypted portion of the partially encrypted packet has start code emulation. In response, start code emulation prevention data may be inserted only in the partially encrypted packet. The partially encrypted packet with an indication of the identified unencrypted portion is transmitted.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
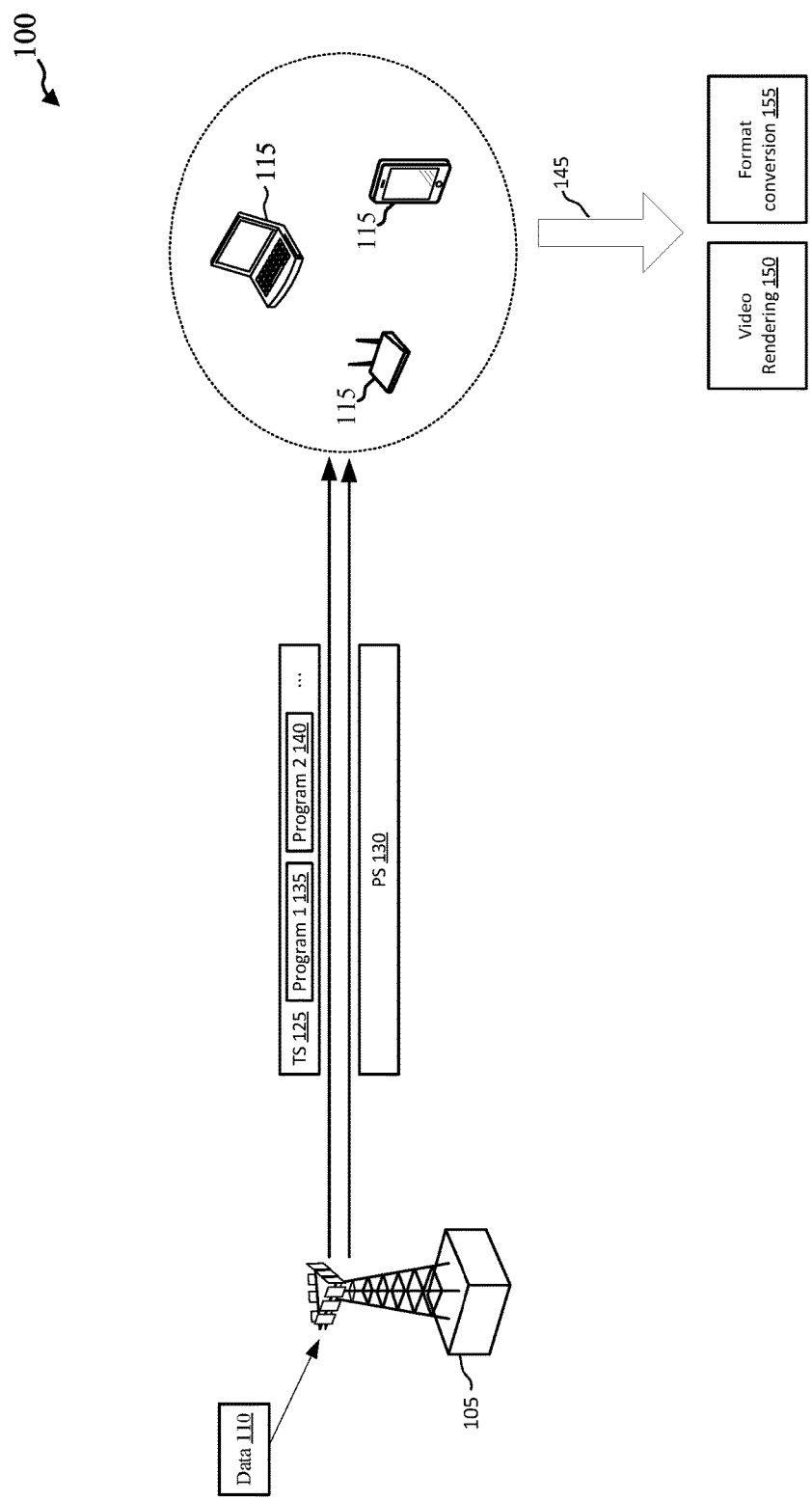
FIG. 1 depicts an example communications system for broadcasting digital media, including video in an MPEG-2 Transport Stream.

Systems and techniques are described herein for select placement of false synchronization point or start code indicators (e.g., emulation prevention indicators or emulation prevention bytes (EPBs)) in data for transmission and/or presentation to a user. In one aspect, video and/or audio data may be transmitted in MPEG-2 format over the transport stream (TS), such as a digital video broadcast (DVB) including multiple programs or channels. TS packets, which may also correspond to Network Abstraction layer Units (NALUs), including corresponding lower layer packets (packetized elementary stream (PES) packets), of the stream may be at least partially encrypted. In some instances, each TS/PES packet may include an indication of which portions or bytes of the packet are encrypted/un-encrypted. In the process of encoding the video/audio data for transmission, for example in an elementary stream (ES), each frame or part of a frame may be identified by a start code, for example, inserted in the data prior to the start of a frame or portion of a frame. After the start code(s) are inserted into the data, part or all of each frame or portion of the elementary stream may be encrypted. The data, including the start codes, may then be packetized and organized into Packetized ES (PES) packets, including a start code and a header. Either after encryption or after selection or determination of which portions of the packet will be encrypted, the unencrypted portion of the data, excluding the start code, may be searched for any instances of data that replicates the start code and which may incorrectly signal the start of a new frame, etc. If any instances are found, a false start code indicator or emulation prevention byte (EPB) may be inserted into the data prior to the start code replication, to prevent incorrect decoding of the data that may cause splitting of a frame. Each PES packet may then be organized into TS packets/NALUs for transmission.

According to the described techniques, in one example, the encryption process may be implemented in such a way that a replication of the start code will not appear post encryption, (e.g., in the encrypted portion of each PES/TS packet). As a result, the encrypted portion of each PES packet does not need to be searched for any occurrence of start code emulation. This reduction in searching may increase the efficiency at which data is encoded and encrypted, e.g., processed, for transmission. In addition, more data may be sent in each PES packet and hence each TS packet/NALU, as less EPBs will be inserted into the data or payload of video/audio that is transmitted. These advantages of the described techniques will likewise be realized on the receiving end, such that the decoding process will be more efficient by not having to search the entire packet for EPBs. In another example, by simply not searching the portions of each packet that are indicated to be encrypted, the need to insert emulation prevention bytes in the encrypted data may be eliminated. In other words, current encryption techniques may be implemented without modification (e.g., the occurrence of start code emulation in the encrypted data may occur, but may not affect the decoding process with a modified algorithm for start code searching described herein), and still enable the advantages provided by the described techniques.

In some cases, by including an indication of which portion (e.g., in terms of bytes) of the PES packet/TS packet or NALU is encrypted and/or which portion is un-encrypted, for example in the packet or in a higher layer packet, the frame boundary may be determined. In one example, each indication of which portions or bytes in a packet are encrypted and un-encrypted may be set to indicate and correspond to a picture or frame boundary. This may provide additional redundancy in determining where the start of each frame is in the packet stream and in verifying which bytes to search for EPBs in each packet (e.g., determining which bytes are unencrypted and which bytes are encrypted)

In some cases, the described techniques may provide for easier conversion from one data format to another data format. In one example, MPEG-2 packets may be more easily converted to MPEG 4 packets or .mp4 formats, due to the fact that there will no EPBs in the encrypted proton of each packet. This may allow a direct correspondence between payloads in each format, such that only header information needs to be modified in order to effect the format conversion. Stated another way, the payload of each packet can be transferred to the other format without having to search or modify the underlying data. This may provide additional efficiencies, for example, in converting broadcast video into different formats for storage and other uses.

FIG. 1 illustrates an example system 100 in which video data 110 may be broadcast from a service 105 to one or more client devices 115. As illustrated, the broadcast service 105 may receive data 110, such as data associated with one or more DVB programs or channels. The broadcast service 105 may encode, encrypt, and packetize the data 110 into an MPEG-2 TS 125, and identify packets associated with each program 135 and 140, for example, using one or more identifiers in the header of each TS packet/NALU 135 and 140. The broadcast service 105 may also encode, encrypt, and packetize the data 110 into an MPEG-2 program stream 130 for transmission to one or more client devices 115. In the process of encoding and encrypting the data 110, the broadcast service 105 may selectively insert identifiers of false start codes (e.g., EPBs) into only un-encrypted data contained in each packet to be transmitted. Each packet of data transmitted may include an indication of which portions of the data are encrypted and which portions are unencrypted. In some instances, the broadcast service 105 may indicate to the recipient client device 115 that each packet may include, and/or each identification of which portions of each packet are encrypted/un-encrypted may indicate, a complete frame or other unit of data. This may provide additional redundancy in the correct identification of frames or boundaries in the data 110/packets, for example, in the event that the encrypted data includes a replication of the start code, the encrypted data was corrupted, etc.

One or more client devices 115 may receive the TS data 125 and search for one or more start codes, indicated by operation 145. Upon identifying a start code, the client device 115 may identify indicator(s) in the header of each packet of which portions of the packet are encrypted and un-encrypted. The client device 115 may search for EPBs in the un-encrypted portion(s) and decrypt the encrypted portions without searching for EPBs. Upon finding an EPB, the client device 115 may discard the proximate information that corresponds to the start code. Upon completion of start code emulation removal and decryption, the data may be rendered on the client device at operation 150. In some instances, the data may be converted to another format, such as MPEG 4 and either rendered or stored at operation 155.

It should be appreciated that the examples described above are only provided for illustrative purposes. The described techniques may be applied in any scenario where packetized data is transmitted, at least partially encrypted, and EPBs or other indicators are inserted into the data to aid in synchronization, decoding, and other operations performed on the data.

Figure 2:
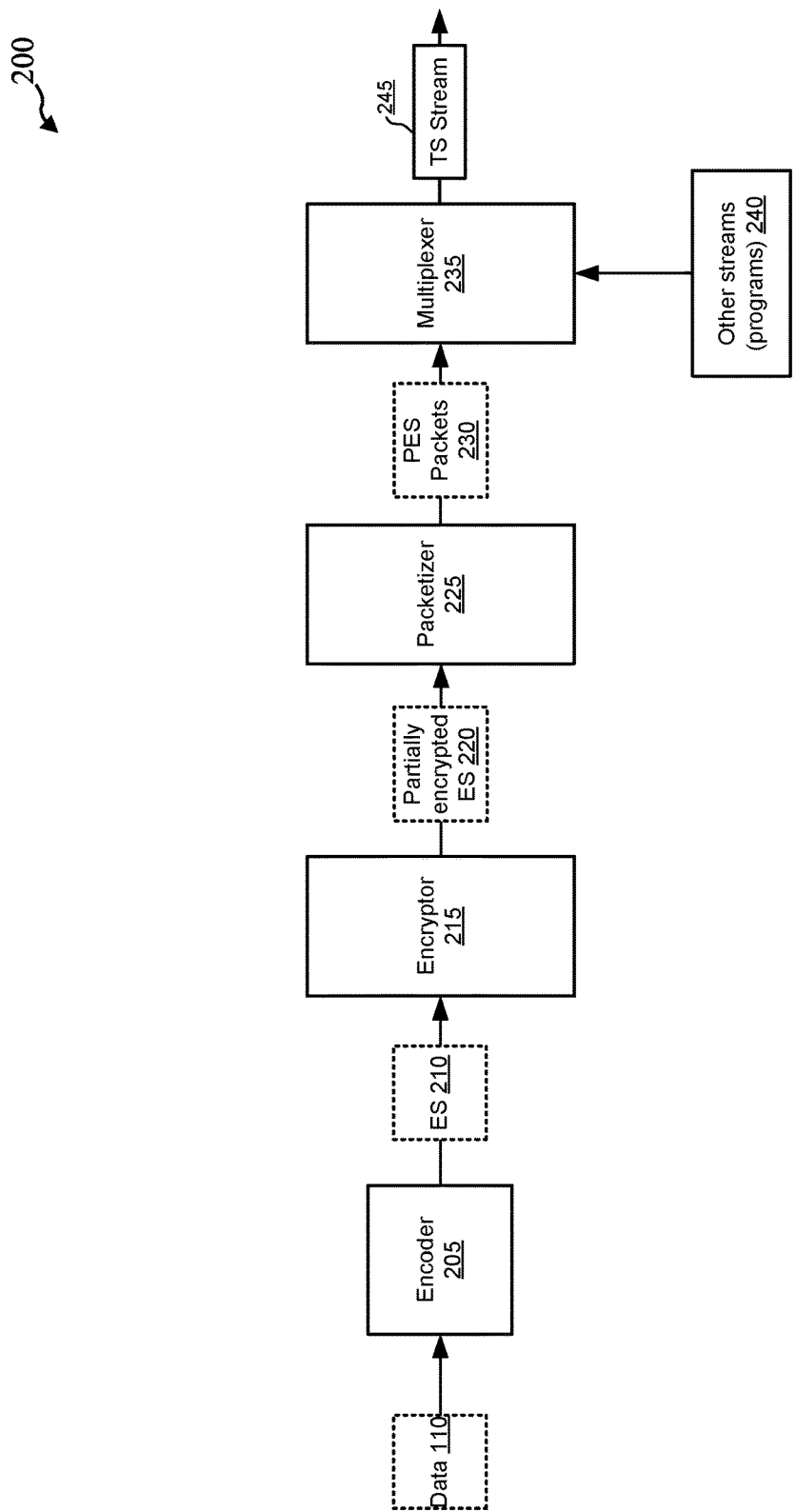
FIG. 2 depicts an example process for packetizing data for transmission in an MPEG-2 Transport Stream.
Figure 3:
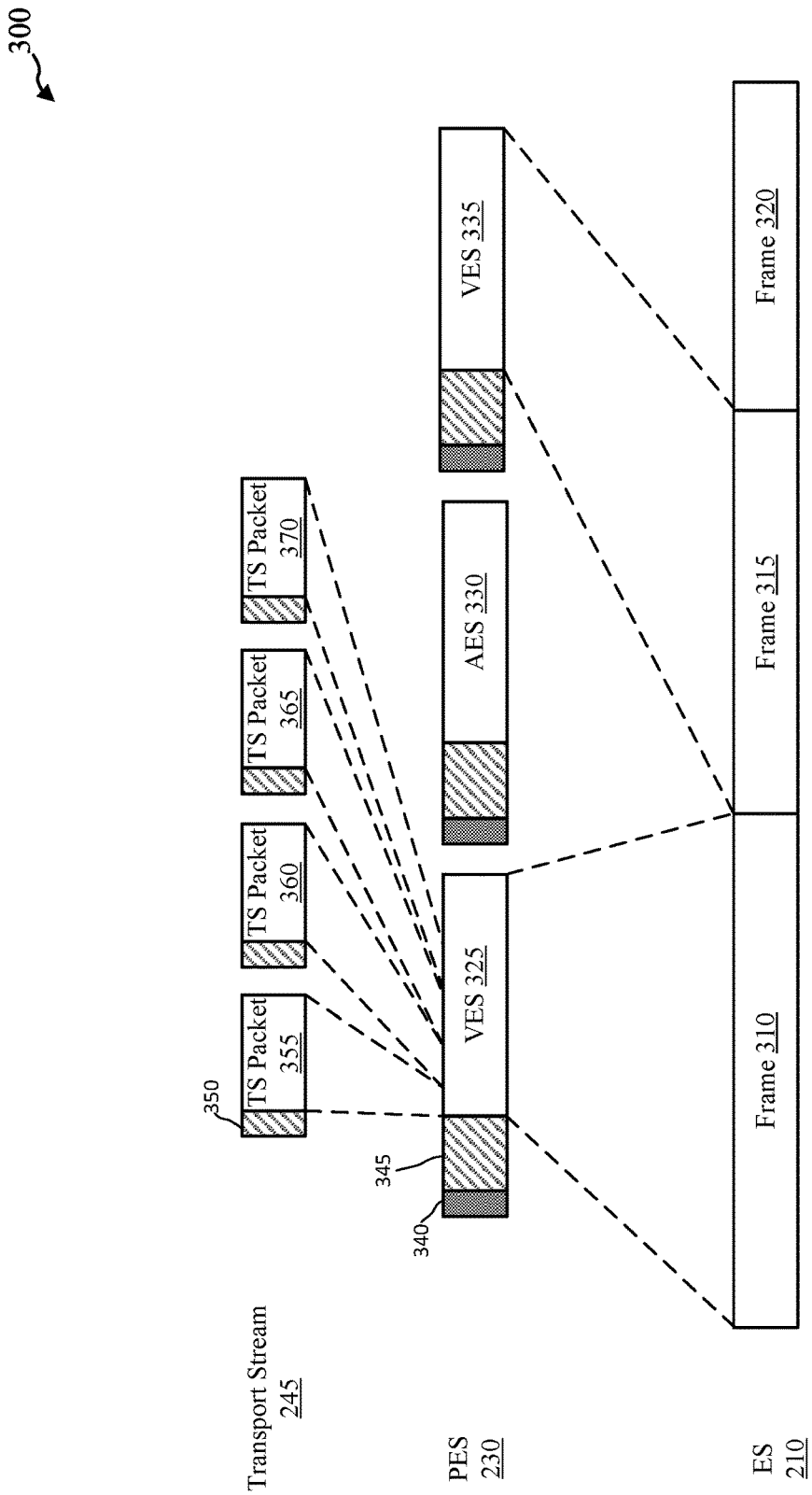
FIG. 3 depicts an example of TS packets/NALUs mapped to Packet Elementary Stream (PES) packets, which are mapped to image frames.

FIG. 2 illustrates a diagram of a system and process 200 for encoding and encrypting data 110 for transmission, for example that may be implemented by broadcast service 105. An encoder 205 may receive data 110, for example comprising a video data file. The encoder 215 may process and/or compress, etc., the data to output an Elementary Stream (ES) 210, which may include a number of frames 310, 315, 320, as illustrated in FIG. 3. The encoder 205 may add start codes to the beginning of each frame 310, 315, 320 to indicate the start of each packet/frame. The encryptor 215 may receive the ES 210 and, after separating out video from audio data, may encrypt at least a subset of the video data contained in frames 310, 315, 320. In some aspects, this may include encrypting data in some of each frame 310, 315, 320, or only encrypting data in some of frames 310, 315, 320. The partially encrypted ES 220 produced by the encryptor 215 may be received by a packetizer 225, which may generate a number of PES packets 230 from the partially encrypted ES 220. The PES packets 230 may include video ES (VES) packets 325, 335, and audio ES packets (AES) 330. The packetizer 225 (or other components of system 200/broadcast service 105) may add a start code 340 to indicate the beginning of each PES packet 230 and header information 345. The packetizer 225 may also add an indication of which portions or bytes of each VES packet 325, 335 are encrypted and which portions are un-encrypted or clear. This will be described in greater detail in reference to FIG. 4 below. The packetizer 225 may also search the clear portions of each packet 325, 335 to determine if there are any false or emulated start codes in the data, aside from the initial and intended start code 340. Upon determining that one or more start code emulations are present, packetizer 225 may insert an EPB preceding the start code emulation to prevent the data from being interpreted as another start code. It should be appreciated that a similar process may, if desired, be performed on the audio data or AES packets 330.

A multiplexer 235 may then combine the audio stream back with the video stream comprising the PES packets 230, and/or other video and audio streams 240, add Transport Stream (TS) header information 350 to the VES packets 325, 335 to form TS packets/NALUs 355, 360, 365, and 370, and communicate the generated TS stream 245 to one or more transceivers for transmission and/or to one or more storage devices for storage.

Figure 4:
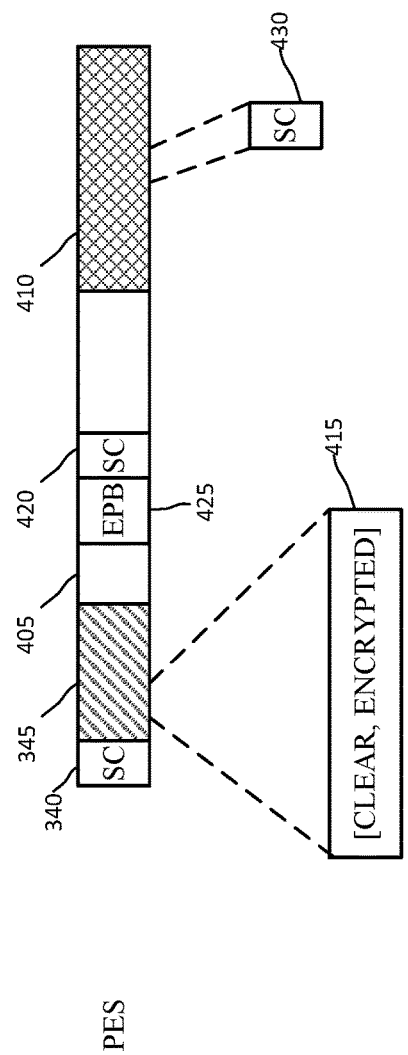
FIG. 4 depicts an example of a partially encrypted modified PES packet without an emulation prevention byte in the encrypted portion of the packet.

FIG. 4 illustrates a detailed example of a partially encrypted PES packet 400, with an EPB inserted only in the unencrypted portion of data in the packet 400. The PES packet 400 may contain a start code 340, header information 345, an unencrypted portion of data 405, and an encrypted portion of data 410. As described above, the start code 340 may include a certain number of bits (e.g., 0X03 in hex, or any other number of set of numbers) to indicate the start of the packet 400. The header 345 may include various fields, including, for example, stream ID, packet length, optional PES header, stuffing bytes, etc. The header 340 may also include an indication 415 of which bytes in the packet are un-encrypted or "CLEAR" and encrypted or "ENCRYPTED." In some instances, the indication 415 may include a start byte identifier and a length byte identifier (or a range of bytes, for example, including a start byte and an end byte) for one or both of the fields CLEAR or ENCRYPTED. In other examples, a higher layer packet, such as a TS packet 355, 360, 365, 370 may include the indication of which portions or bytes of the PES packet 400 are CLEAR and which are ENCRYPTED. It should be appreciated, that as used herein, a TS packet may be equivalent to or be included in a Network Abstraction Layer Unit (NALU), for use, for example, in other transmission protocols or formats.

In the process of generating packet 400, and upon determination of which portions will be CLEAR and which will be ENCRYPTED, the CLEAR data 405 may be searched for any instances of start code emulation. Upon finding a start code emulation 420 (e.g., a complete emulation or the entire start code, or a portion thereof), one or more EPBs 425 may be inserted into the CLEAR data 405 prior to the occurrence of one or more start code emulations 420. In this way, incorrect identification of false start codes may be reduced or eliminated. According to the indication 415, the encrypted portion(s) 410 of packet 400 may not need to be searched for start code emulations, as the encrypting process may obscure any instances of start code emulation. In this way, start code emulation 430 may not occur in the encrypted portion of data 410.

In the decoding process, upon identification of packet 400 via start code 340, the header information 345 may be searched and the indication 415 may be identified. According to the indication 415, the decoder/receiver may search the CLEAR bytes or portion(s) 405 for emulation prevention bytes 425. Upon identifying EPB 425, the EPB 425 may be removed or discarded and the start code 420 immediately following the EPB 425 may be ignored as an indicator of a new frame/packet 400. The encrypted portion 410 does not need to be searched for EPBs/start code emulations 430, and so can be directed to a decryption process to recover the encrypted data 410. Subsequently, the header 345 may be removed, and the video data may be recovered, stored, and/or rendered at the receiving device.

In some aspects, there may be multiple CLEAR 405 and/or multiple ENCRYPTED portions 410 or different chunks of data in a single packet 400. In this scenario, the indication 415 may indicate this information in a variety of ways, including identifying start and length identifiers/bytes for the CLEAR sections, the ENCRYPTED sections, or a combination thereof, range values, including start and end bytes for each portions, etc. It should be appreciated that other identifiers and identification schemes can be used and are contemplated herein.

In some examples, the indication 415 may be designed to correspond to, and/or separately indicate that each packet 400 contains a complete video frame. This may provide redundancy in accurate identification of the start and end of each packet 400. In some aspects, this correspondence between a packet and a complete frame (or other unit or divisions of data that may be based on the data contained in the packets) may be implement system-wide, may be indicated separately between two or more devices upon the start of a connection, or may be indicated in one or more packets in a transmit stream. In some cases, the correspondence between a packet and a frame may be indicated in storing the data, such as in header or other information.

The above-described techniques may maintain a high level of synchronization and quick determination of the start of each packet, without requiring additional EPBs to be inserted into the packets.

Figure 5:
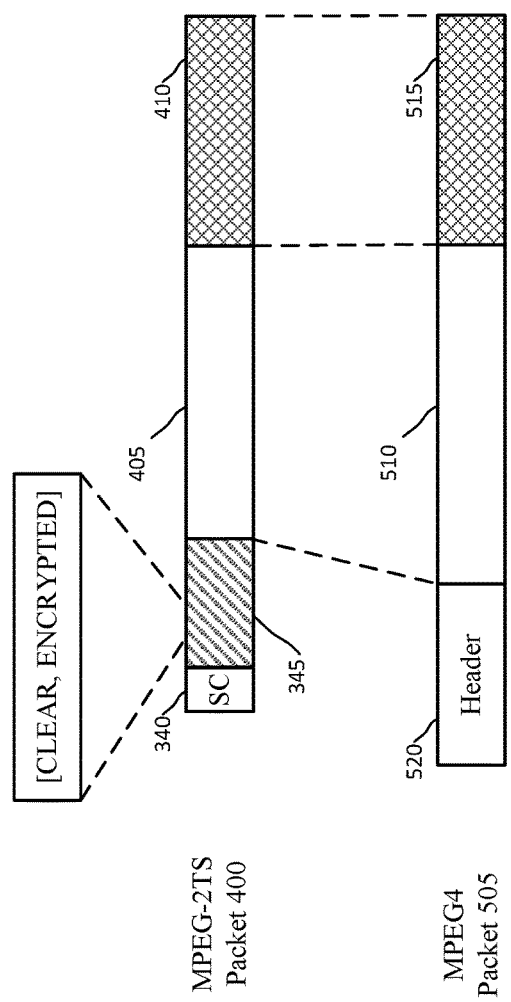
FIG. 5 depicts an example of a modified MPEG 2 packet mapped to an MPEG 4 packet.

FIG. 5 illustrates a diagram 500 showing a mapping between an MPEG-2 PES packet 400 and an MPEG 4 or .mp4 packet 505. By removing the insertion of EPBs into the encrypted chunks of MPEG-2 TS packets (or PES packets), such packets may be more easily converted to conform to the MPEG-4 (H.264) and other formats (e.g., H.265). In one example, by implementing a similar technique in the MPEG-4 format (or other formats such as H.265), and only inserting EPBs in CLEAR or un-encrypted portions or bytes 510 in MPEG-4 packets/NALUs 500, conversion between the two formats may be made more efficient. In this way, encrypted portions 515 of MPEG-4 packets 500 may be converted to MPEG-2 and vice versa without the need to decrypt the encrypted data 410, 515 and/or search for EPBs in the encrypted data 410, 515.

Figure 6:
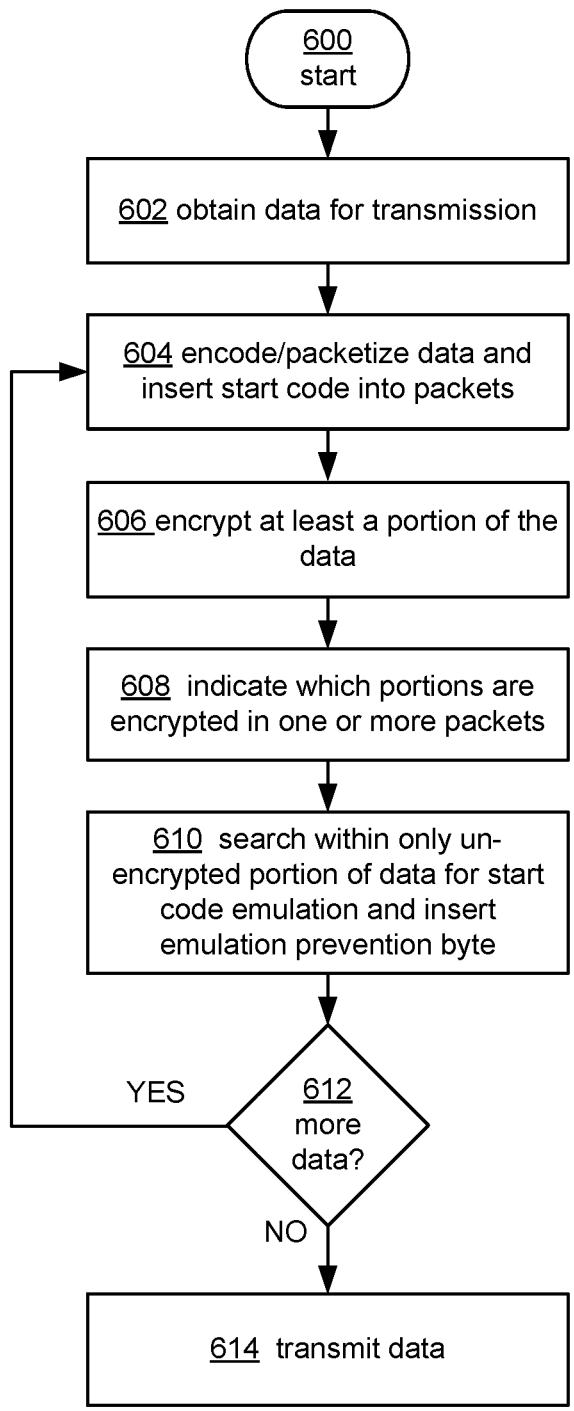
FIG. 6 depicts an example operational procedure for selectively inserting one or more EPBs into a data stream for transmission.

FIG. 6 illustrates an example process 600 for selectively searching within and inserting EPBs into un-encrypted portions of a data packet, such as an MPEG-2 or MPEG-4 packet or NALU. Process 600 may begin at operation 602, where data for transmission may be obtained or retrieved, for example for DVB or other applications. The data may, at operation 604, be encoded and divided/organized into packets. Operation 604 may include adding header information to the data and adding a start code to identify the start of each packet. At least a portion of one or more packets may be encrypted at operation 606, using any of a variety of encryption techniques. Either before or after operation 606, portions of data that are to be encrypted and/or unencrypted in the one or more packets may be identified and indicated in the packet, at operation 608. The unencrypted data in the one or more packets may be searched for instances of start code emulation (full or partial emulation) and emulation prevention byte(s) or other indicators may then be inserted into the unencrypted data in the one or more packets at operation 610. It may then be determined if there is more data for processing and preparation for transmission at operation 612. If there is more data, process 600 may continue to loop through operations 604 through 610 until it is determined that no more data is available for transmission, at which point, the data may be transmitted at operation 614. In some aspects, data may alternatively be transmitted at operation 614 as it is processed, based on capacity of one or more buffers, etc. The implementation of process 600 may result in increased efficiency in transmitting data in various formats where start code emulation prevention techniques are implemented and at least part of the data is encrypted.

Figure 7:
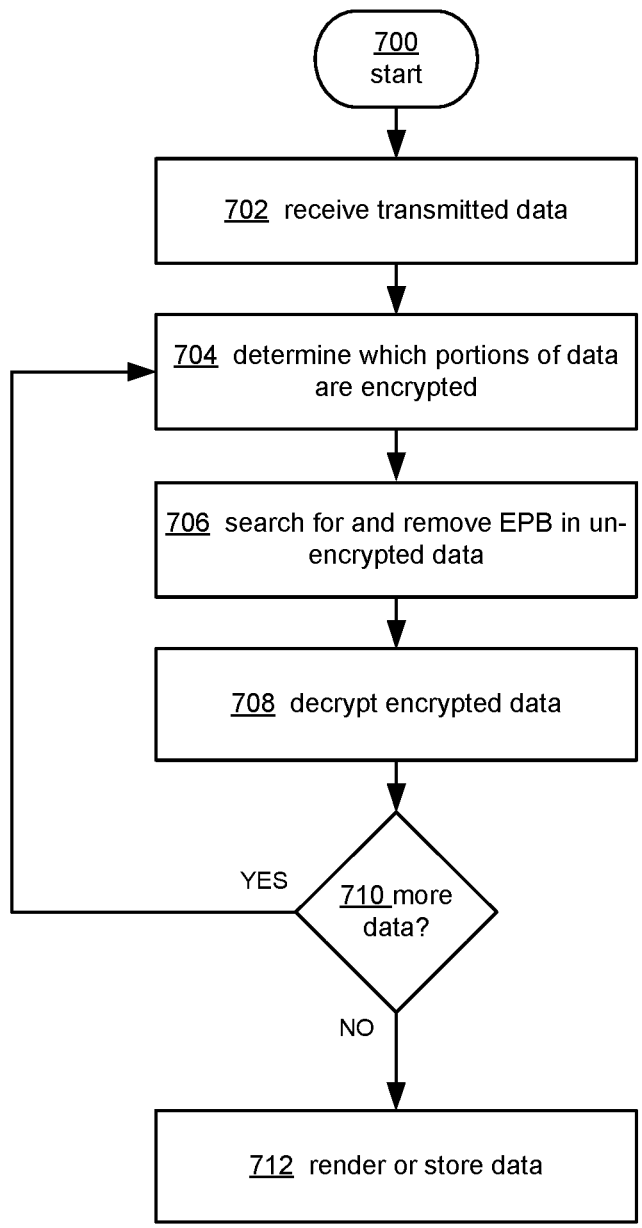
FIG. 7 depicts an example operational procedure for decoding a data stream including one or more EPBs.

FIG. 7 illustrates an example process for decoding/processing data containing emulation prevention bytes or other similar indicators in only a portion of the data, such as data produced by process 600. Process 700 may begin at operation 702, where data, such as transmitted data, may be received, for example, by a user device. Next, at operation 704, the portions of the data that are to be encrypted may be determined, for example, by identifying and reading the indication 415 in each packet (in some instances, prior to operation 704, individual packets may be identified from the stream via searching for and identifying start codes). At operation 706, the un-encrypted data in each packet/NALU may be searched for any instances of EPBs. Upon identifying one or more EPBs, the EPB may be removed and the data immediately following the EPB may be ignored as an indication of a start code for another packet/frame. The encrypted portion of the data of each packet may be decrypted at operation 708. It should be appreciated that operations 706 and 708 may be performed in a different order and/or concurrently. Process 700 may continue to operation 710, where it may be determined if more data has been received/is available for processing. If there is more data, process 700 may loop through operations 704-708, until it is determined that no more data is available or enough data has been processed to render the received data, and the received and processed data may be rendered or stored at operation 712. The implementation of process 700 may result in a more efficient system for decoding received data, for example, when at least part of the data is encrypted and EPBs and/or start codes are only placed in un-encrypted portions of the data.

Figure 8:
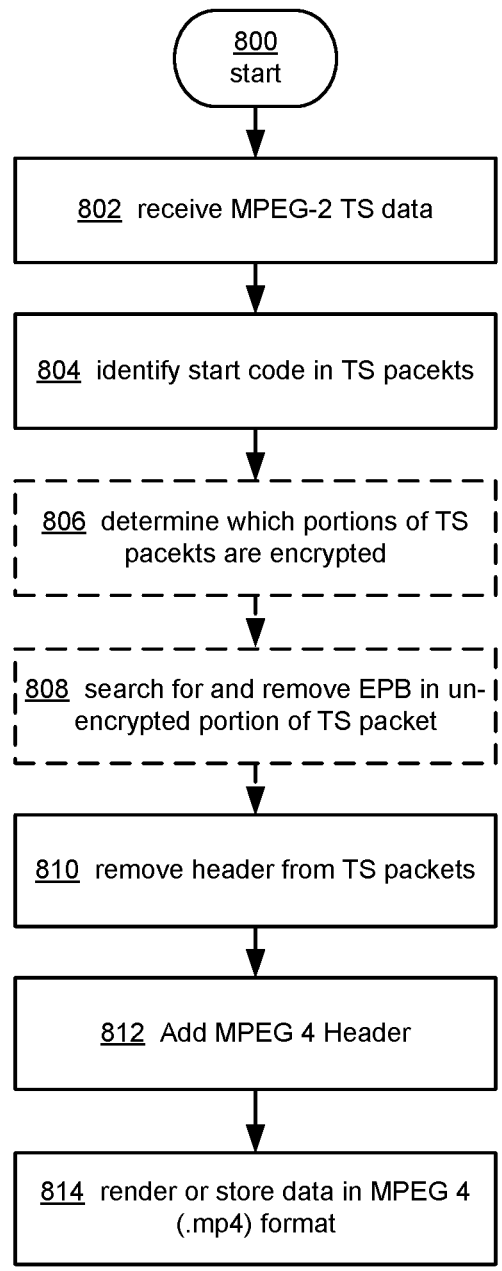
FIG. 8 depicts an example procedure for converting MPEG 2 TS packets to MPEG 4 packets.

FIG. 8 illustrates an example process 800 for converting MPEG-2 TS formatted data to MPEG-4 formatted data, for example for more efficient rendering or storage of the data, or for more efficient transmission of the data. It should be appreciated that the reverse conversion may also be effectuated via a similar process, and that other formats may be converted according to a similar process as well.

Process 800 may begin with operation 802, where MPEG-2 TS data (packets/NALUs) may be received. Next, at operation 804, individual MPEG-2 TS packets may be identified via start codes. At operation 806, it may be determined which portions of the packets are encrypted. At operation 808, within the unencrypted data, EFBs may be searched for and removed from the packets. Header information from the TS packets/NALUs may be removed at operation 810, and an MPEG-4 compatible header may be added in its place at operation 812. The converted data may then be rendered or stored in the MPEG-4 (.mp4) format 814.

In some aspects, operations 806 and/or 808 may be omitted from process 800. In this scenario, only header information and the boundaries thereof (and potentially length of the packet itself) need to be identified in order to effectuate the conversion, if the formats share the same EFB identifier and insertion processes. In this way, data inside each MPEG-2 packet need not be modified in order to convert to another format. In some aspects, process 800 may be implemented prior to transmitting data, for example, in a MPEG-2 TS to enable a rendering of the data at a lower bit-rate.

Figure 9:
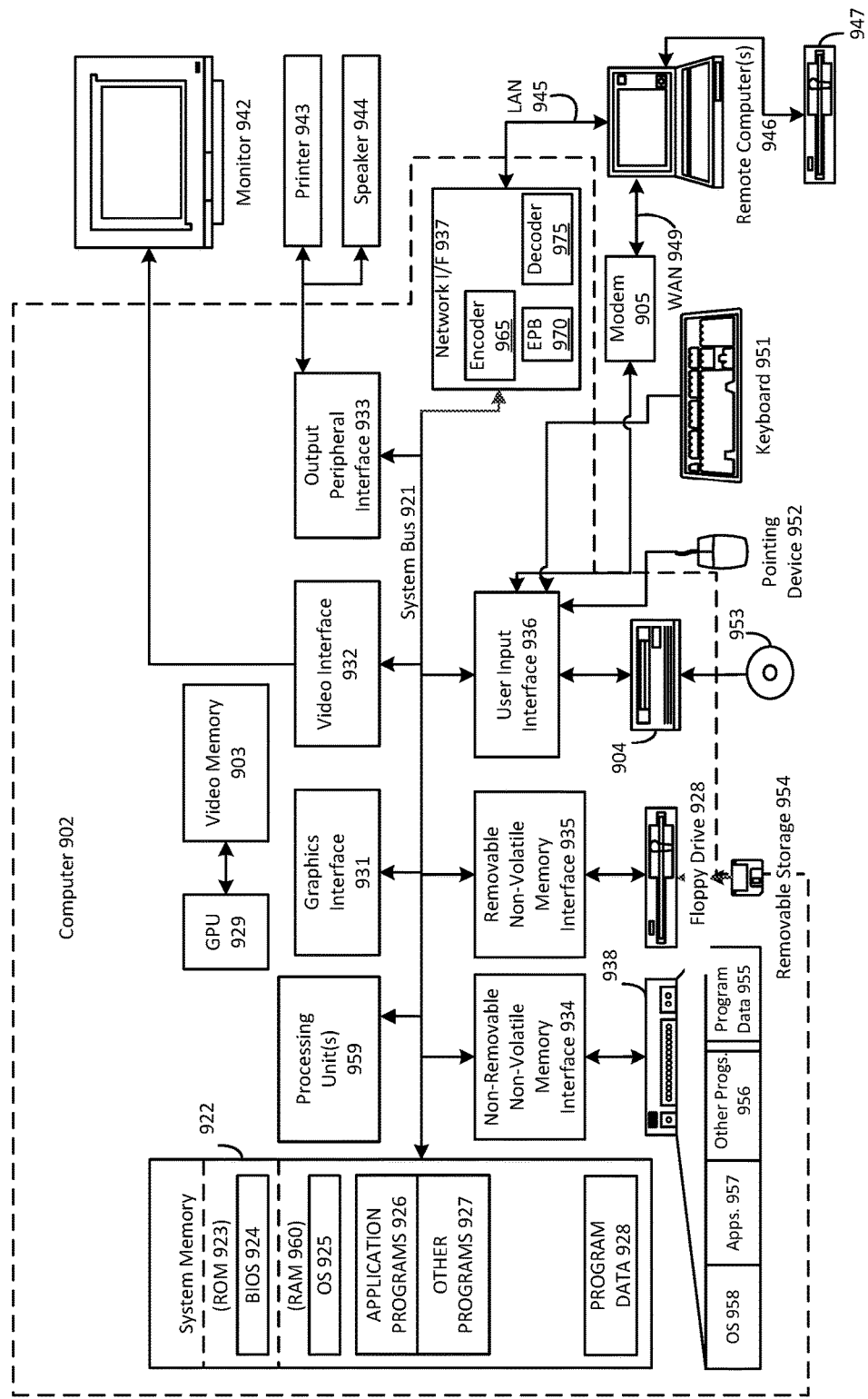
FIG. 9 depicts an example general purpose computing environment in which in which the techniques described herein may be embodied.

The encoder 205, the encryptor 215, the packetizer 225, and the multiplexer 235 and the techniques described above may be implemented on one or more computing devices or environments, as described below. FIG. 9 depicts an example general purpose computing environment in which in which some of the techniques described herein may be embodied. The computing system environment 902 is only one example of a suitable computing environment and is not intended to suggest any limitation as to the scope of use or functionality of the presently disclosed subject matter. Neither should the computing environment 902 be interpreted as having any dependency or requirement relating to any one or combination of components illustrated in the example operating environment 902. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 902, which may include any of a mobile device or smart phone, tablet, laptop, desktop computer, etc., typically includes a variety of computer-readable media. Computer-readable media can be any available media that can be accessed by computer 902 and includes both volatile and nonvolatile media, removable and non-removable media. The system memory 922 includes computer-readable storage media in the form of volatile and/or nonvolatile memory such as read only memory (ROM) 923 and random access memory (RAM) 160. A basic input/output system 924 (BIOS), containing the basic routines that help to transfer information between elements within computer 902, such as during start-up, is typically stored in ROM 923. RAM 960 typically contains data and/or program modules that are immediately accessible to and/or presently being operated on by processing unit 959. By way of example, and not limitation, FIG. 9 illustrates operating system 925, application programs 926, other program modules 927, and program data 928.

The computer 902 may also include other removable/non-removable, volatile/nonvolatile computer storage media. By way of example only, FIG. 9 illustrates a hard disk drive 938 that reads from or writes to non-removable, nonvolatile magnetic media, a magnetic disk drive 939 that reads from or writes to a removable, nonvolatile magnetic disk 954, and an optical disk drive 14 that reads from or writes to a removable, nonvolatile optical disk 953 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 938 is typically connected to the system bus 921 through an non-removable memory interface such as interface 934, and magnetic disk drive 939 and optical disk drive 904 are typically connected to the system bus 921 by a removable memory interface, such as interface 935.

The drives and their associated computer storage media discussed above and illustrated in FIG. 9, provide storage of computer-readable instructions, data structures, program modules and other data for the computer 902. In FIG. 9, for example, hard disk drive 938 is illustrated as storing operating system 958, application programs 957, other program modules 956, and program data 955. Note that these components can either be the same as or different from operating system 925, application programs 926, other program modules 927, and program data 928. Operating system 958, application programs 957, other program modules 956, and program data 955 are given different numbers here to illustrate that, at a minimum, they are different copies. A user may enter commands and information into the computer 902 through input devices such as a keyboard 951 and pointing device 952, commonly referred to as a mouse, trackball or touch pad. Other input devices (not shown) may include a microphone, joystick, game pad, satellite dish, scanner, or the like. These and other input devices are often connected to the processing unit 959 through a user input interface 936 that is coupled to the system bus, but may be connected by other interface and bus structures, such as a parallel port, game port or a universal serial bus (USB). A monitor 942 or other type of display device is also connected to the system bus 921 via an interface, such as a video interface 932. In addition to the monitor, computers may also include other peripheral output devices such as speakers 944 and printer 943, such as a 3D printer, which may be connected through a output peripheral interface 933.

The computer 902 may operate in a networked environment using logical connections to one or more remote computers, such as a remote computer 946. The remote computer 946 may be a personal computer, a server, a router, a network PC, a peer device or other common network node, and typically includes many or all of the elements described above relative to the computer 902, although only a memory storage device 947 has been illustrated in FIG. 9. The logical connections depicted in FIG. 9 include a local area network (LAN) 945 and a wide area network (WAN) 949, but may also include other networks. Such networking environments are commonplace in offices, enterprise-wide computer networks, intranets and the Internet.

When used in a LAN networking environment, the computer 902 is connected to the LAN 945 through a network interface or adapter 937. As illustrated, the network interface 937 may include an encoder 965, a decoder 975, and an EPB component 970, which may implement the techniques described above for selective insertion of EPBs into unencrypted data for transmission. Encoder 965, decoder 975, and EPB component 970, may additionally or alternatively be implemented by or in conjunction with processing unit(s) 959 or other components of computing device 902, such as to enable conversion between data formats for storage or other purposes. When used in a WAN networking environment, the computer 902 typically includes a modem 905 or other means for establishing communications over the WAN 949, such as the Internet. The modem 905, which may be internal or external, may be connected to the system bus 921 via the user input interface 936, or other appropriate mechanism. In a networked environment, program modules depicted relative to the computer 902, or portions thereof, may be stored in the remote memory storage device. By way of example, and not limitation, FIG. 9 illustrates remote application programs 948 as residing on memory device 947. It will be appreciated that the network connections shown are example and other means of establishing a communications link between the computers may be used.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for decoding data, the system comprising:
   a computing device communicatively coupled to a receiver, the computing device configured to:
   receive a partially encrypted packet having an unencrypted portion;
   identify a portion of the partially encrypted packet that is unencrypted;
   determine that the unencrypted portion of the partially encrypted packet comprises start code emulation; and
   in response to the determining that the unencrypted portion has start code emulation, search for start code emulation prevention data only in the unencrypted portion of the partially encrypted packet.

2. The system of claim 1, further comprising:
   a second computing device communicatively coupled to a transmitter, wherein the receiver is configured to:
   identify the portion of the partially encrypted packet that is unencrypted;
   determine that the unencrypted portion of the partially encrypted packet comprises start code emulation;
   in response to the determining that the identified unencrypted portion has start code emulation, insert the start code emulation prevention data in the unencrypted portion of the partially encrypted packet; and
   transmit the partially encrypted packet with the start code emulation prevention data in the unencrypted portion of the partially encrypted packet.

3. The system of claim 1, wherein the computing device is further configured to:
   receive an indication of the start code emulation prevention data in the unencrypted portion of the partially encrypted packet, wherein the search for the start code emulation prevention data is performed based on determining that the unencrypted portion has start code emulation and the indication of the start code emulation prevention data.

4. The system of claim 3, wherein the indication of the start code emulation prevention data comprises a start byte identifier and a length byte identifier or a start byte and an end byte.

5. A method for decoding data, the method comprising:
   receiving a partially encrypted packet and an indication that the packet has an unencrypted portion;
   identifying start code emulation prevention data in the unencrypted portion of the partially encrypted packet;
   removing the start code emulation prevention data from the unencrypted portion of the partially encrypted packet; and
   decrypting the partially encrypted packet.

6. The method of claim 5, wherein the start code emulation prevention data is inserted only in the unencrypted portion of the partially encrypted packet.

7. The method of claim 5, further comprising searching for the start code emulation prevention data only in the unencrypted portion of the partially encrypted packet.

8. The method of claim 5, wherein the encrypted portion of the partially encrypted packet does not include a start code.

9. The method of claim 5, wherein the partially encrypted packet comprises a Moving Picture Experts Group (MPEG)-2 Transport Stream (TS) packet.

10. The method of claim 5, wherein the partially encrypted packet comprises a MPEG-4 packet converted from a partially encrypted MPEG-2 TS packet.

11. The method of claim 5, wherein the indication is inserted into a header of the partially encrypted packet.

12. The method of claim 5, wherein the indication comprises a start byte identifier and a length byte identifier or a start byte and an end byte.

13. The method of claim 5, wherein the indication is included in another packet received with the partially encrypted packet.

14. The method of claim 5, wherein the partially encrypted packet comprises digital video broadcast data.

15. The method of claim 5, wherein the indication further comprises a second indication of an encrypted portion of the partially encrypted packet.

16. A non-transitory computer readable storage medium having stored thereon instructions that, upon execution by at least one processor, cause the at least one processor to perform operations for decoding data, the operations comprising:

receiving at least one partially encrypted packet;
identifying start code emulation prevention data in at least one identified unencrypted portion of the at least one partially encrypted packet;
removing the start code emulation prevention data from the at least one partially encrypted packet; and
decrypting the at least one partially encrypted packet to recover the data.

17. The non-transitory computer readable storage medium of claim 16, wherein the start code emulation prevention data is inserted in the unencrypted portion of the at least one partially encrypted packet.

18. The non-transitory computer readable storage medium of claim 17, wherein the operations further comprise:
searching for the start code emulation prevention data only in the at least one unencrypted portion of the at least one partially encrypted packet.

19. The non-transitory computer readable storage medium of claim 16, wherein the operations further comprise:
receiving an indication of the at least one identified unencrypted portion of the at least one partially encrypted packet; and
based on the indication, searching for the start code emulation prevention data only in the at least one identified unencrypted portion of the at least one partially encrypted packet.

20. The non-transitory computer readable storage medium of claim 19, wherein the indication comprises a start byte identifier and a length byte identifier or a start byte and an end byte.

* * * * *